Aug. 24, 1965 L. D. AMDAHL ETAL 3,202,805

SIMULTANEOUS DIGITAL MULTIPLY-ADD, MULTIPLY-SUBTRACT CIRCUIT

Filed Oct. 2, 1961 2 Sheets-Sheet 1

LOWELL D. AMDAHL
MELVIN A. BREUER
JOHN S. DAVIS
INVENTORS

BY
HARVEY G. LOWHURST
ATTORNEY

LOWELL D. AMDAHL
MELVIN A. BREUER
JOHN S. DAVIS
INVENTORS

BY
HARVEY G. LOWHURST
ATTORNEY

United States Patent Office 3,202,805

Patented Aug. 24, 1965

3,202,805

SIMULTANEOUS DIGITAL MULTIPLY-ADD, MULTIPLY-SUBTRACT CIRCUIT

Lowell D. Amdahl, Northridge, Melvin A. Breuer, Los Angeles, and John S. Davis, Glendale, Calif., assignors, by mesne assignments, to The Bunker-Ramo Corporation, Stamford, Conn., a corporation of Delaware Filed Oct. 2, 1961, Ser. No. 142,074

9 Claims. (Cl. 235—164)

This invention relates to electronic digital computers and more particularly to an arithmetic unit for a digital computer which performs operations such as multiply, multiply-add and multiply-subtract.

The desired operation of the computer arithmetic unit of this invention is to multiply two operands and to add to or subtract from their product a further operand. Heretofore, the time necessary to perform such an operation was necessarily greater than the time required to provide the product of the two operands, the increase in time being needed to either add or subtract the further operand.

Because much time is consumed in arithmetic operations in computers, the faster parallel arithmetic units, though more complicated and therefore more expensive than the slower serial arithmetic units, have become widely used. With serial arithmetic units, any operation upon two words (operands) requires a minimum of a full word-time since one word must be serially shifted through the arithmetic unit. In parallel arithmetic units, some operations may be performed in a simple bit-time such as the addition of two words since the word may be shifted into the arithmetic unit in a single bit-time. The very minimum amount of time required to multiply two words by a parallel arithmetic unit when the multiplier is available serially is one word-time, that is "$n$" bit times where "$n$" is the number of bits or digits in the multiplicand.

Accordingly, the above-stated operation, namely that of forming the product of two operands and adding to or subtracting from the product a further operand has required a minimum of "$n$" bit-times for forming the product and at least two additional bit-times to add or to subtract the further operand. One of the added bit-times has been required to provide the proper command for forming the product and commencing the add operation and the other added bit-time has been used to perform the actual operation.

Component wise, an additional parallel output register and much additional gating circuitry must be provided to hold the third operand and to introduce it at the right time into the arithmetic unit. Such additional equipment is expensive and increases the complexity of the computer materially. An alternative method to avoid the additional bulk and cost would be to provide a circulating or shift register to serially introduce the third operand into the arithmetic unit. This operation would, however, take a whole word-time thereby increasing the time of operation by a factor of 100% if the further operand has the same number of bits or digits as the multiplier.

It is therefore an object of this invention to provide an arithmetic unit capable of forming the product of two operands and adding to or subtracting from the product a further operand in the same time interval used to form the product.

It is another object of this invention to provide a new and improved computer unit which forms the product of two words and adds or subtracts a further word from the product in a minimum amount of time.

Briefly, in the arithmetic unit of this invention one of the two quantities whose product is to be formed, that is the multiplicand, is set into a binary register and has all of its bits applied simultaneously to a parallel adder. The multiplier is set into a shift or circulating register so that its bits may be sequentially applied, least significant bit first, to a logic network which determines whether or not the bit is a "one" or a "zero." If the bit is a "one," the multiplicand which was applied to the parallel adder is transferred as a partial product into a sum register such that the transfer results in each bit being shifted to the next least significant place. The sum register also has all of its stages except $S_1$ (storing the least significant bit) connected to the parallel adder so that all previous partial products are added to the partial product (multiplicand) and the sum is the sum of all partial products. If the multiplicand is a zero, the sum register shifts each bit to a position of one bit less significance. The most significant stage of the sum register also has applied to it the bit from the further operand which is either to be added or subtracted. In this manner, the sum register always holds the sum of all preceding partial products and those bits of the operand to be subtracted or added which correspond in significance to the partial products formed. At the end of the entry of the multiplier the sum register contains the desired result of the two arithmetic operations.

A fuller understanding of the invention may be had by referring to the following description, taken in conjunction with the accompanying drawing, in which.

*Forming the product of operand "a" and "b"*

Figure 1:
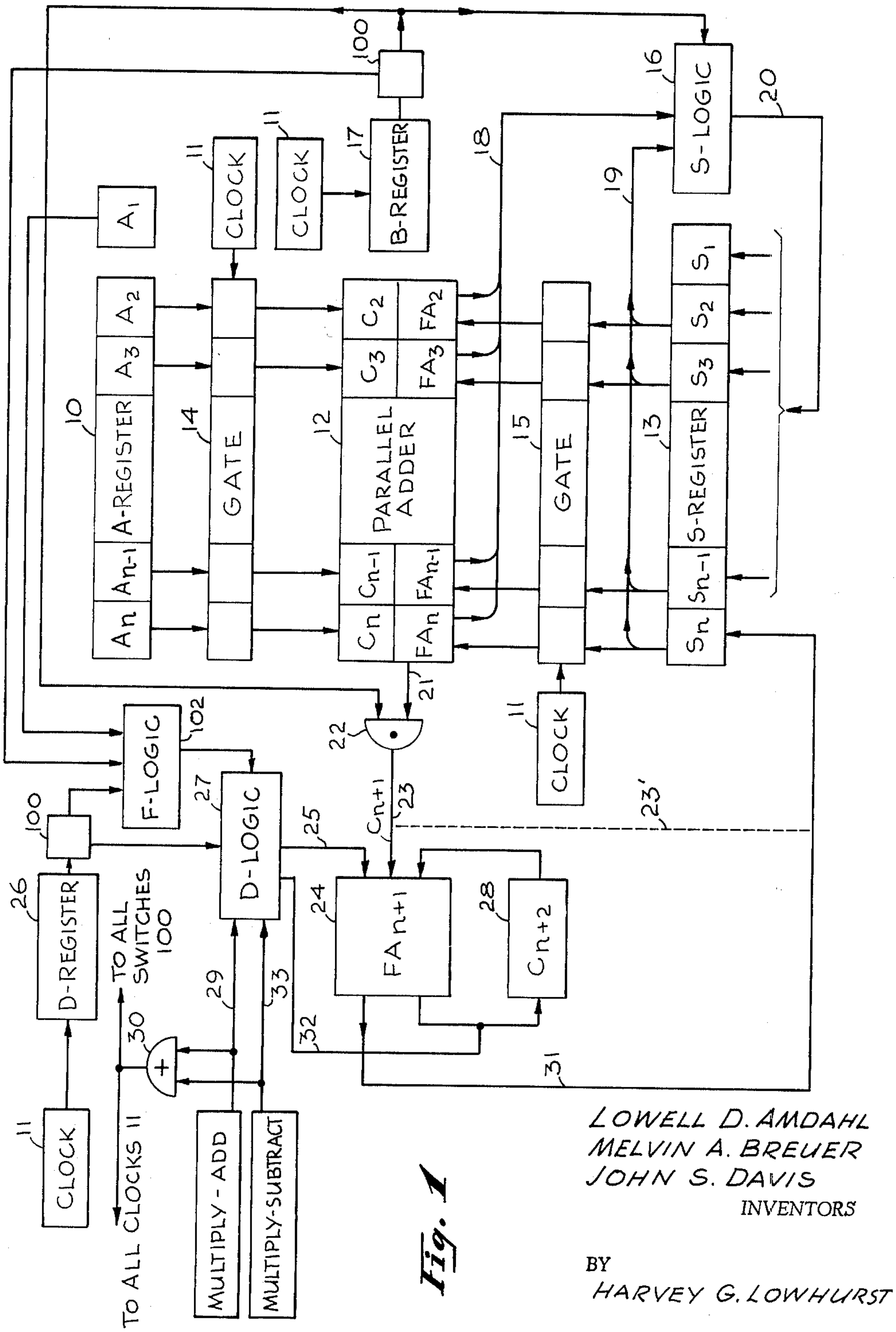
FIGURE 1 is a schematic block diagram of the arithmetic unit of this invention.

Referring now to the schematic block diagram of FIGURE 1, which shows the arrangement of a preferred embodiment of the arithmetic unit of this invention, an A-register 10 is provided which includes equipment for entering information into, for removing information from, and for sequencing such entering and removal of information. A-register 10 comprises a set of "$n$" bistable circuits or stages such as conventional flip-flops, each capable of storing a binary digit. Register 10 is utilized to hold or store the multiplicand "$a$" of the product to be formed, the absolute magnitude of "$a$" being stored in flip-flops "2" to "$n$" and the sign of "$a$" being stored in flip-flop "1."

The individual flip-flops of A-register 10 and the binary digits stored therein are both designated by the capital letter "A" with a numerical subscript indicating the significance of a particular stage or bit. For example, the sign of multiplicand "$a$" is stored in flip-flop $A_1$, the least significant bit of multiplicand "$a$" is stored in flip-flop $A_2$ and holds bit $A_2$ while the most significant bit is stored in flip-flop $A_n$, and holds bit $A_n$. Flip-flop $A_1$, holding the sign of operand "$a$," is utilized in a conventional manner in that it is multiplied with the sign of operand "$b$" and the product of the signs is stored in flip-flop $A_1$. At the proper time at the end of the operation, the product of the signs is transferred together with the product of operand "$a$" and "$b$" to a storage unit. Depending on the product of the signs, the result obtained is either the product or the 2's complement of the produce of operands "$a$" and "$b$."

Information is transferred to A-register 10 and the several other registers used in connection with the arithmetic unit of this invention from a computer memory unit (not shown) such as a magnetic drum, buffer, magnetic tape transport or any of the many well known memory storage units conventionally used in computers. Likewise the control unit which is associated with an electronic computer and which controls the time at which such information is to be transferred to or from the computer memory, has been omitted from FIGURE 1 for samplicity. A clock pulse source 11 is provided which controls the timing of the various operations to be performed by providing clock pulses having a period of one bit-time.

A-register 10 is parallel connected to a parallel adder 12 (FA) which has $n-1$ stages, each stage of parallel adder 12 being associated with a corresponding stage of A-register 10. Also connected to parallel adder 12 is a sum or S-register 13 which includes a set of "$n$" bistable circuits or stages such as flip-flops $S_n$, . . . $S_2$, $S_1$. Connections to parallel adder 12 are made in such a way that each stage of A-register 10 and S-register 13 is applied to a corresponding stage of parallel adder 12 through a plurality of conventional gating circuits 14 and 15, gated by a clock pulse. For example, flip-flop $A_3$ and flip-flop $S_3$ are both connected, through gating circuits 14 and 15 respectively, to two of the three input terminals of full adder stage $FA_3$. As is well known to those skilled in the art, FA designates a full adder which conventionally has three input terminals and sum and carry output terminals. The three input terminals have applied thereto respectively, the corresponding bits of the addend, the augend and the carry of the addend and augend of the next least significant bit. The output terminals respectively provide the sum of the addend, augend and previous carry and any carry generated in this sum.

The sum output terminals 18 of the individual stages of parallel adder 12 are connected to input terminals 20 of all but the most significant stage $S_n$ of S-register 13 through an S-logic network 16. S-logic network 16 performs an important function as a switching means controlled by the output signals from a shift or circulating register 17 also called the B-register which serially provides the bits, in increasing order of significance, of the "$b$" multiplier. Also connected to S-logic network 16 are the output terminals 19 of all but the least significant bit $S_1$ of S-register 13. S-logic 16 in accordance with the state of the bit received from B-register 17, either effectively connects leads 18 or leads 19 to leads 20 so that S-register 13 is "set" either by the output of parallel adder 12 or by the bit in S-register 13 which is stored in a stage of one higher degree of significance.

Parallel adder 12 may be of conventional design and is preferably selected from the "one-bit-time" parallel adders which include special circuitry for fast carry propagation. As already mentioned, time is of the essence in many computer operations and "one-bit-time" parallel adders known today are capable of providing the sum of two words in one bit-time by utilizing a fast carry propagation. For a suitable "one-bit-time" parallel adder, see for example Gilchrist, Pomerene, Wong, Transactions of the Professional Group on Electronic Computers of the IRE (PGEC), p. 133, December 1955.

Parallel adder 12 forms the sum of the word stored in A-register 10 and S-register 13 and applies the sum to S-logic network 16 which either transmits this sum for storage into S-register 13 or which simply shifts the contents of S-register 13 to the right by one bit. The word stored in S-register 13 is the sum of the partial products developed by parallel adder 12 in multiplying the multiplicand by the multiplier. An example will illustrate the development of the product and thereby the operation of A-register 10, parallel adder 12, S-register 13, S-logic network 16 and B-register 17. Let the multiplicand "$a$" be 0.1011 and the multiplier "$b$" be 0.1101. Conventional hand multiplication would be as follows:

| | |
|---|---|
| .1011 | multiplicand |
| × .1101 | multiplier |
| 1011 | 1st partial product |
| 0000 | 2nd partial product |
| 1011 | 3rd partial product |
| 1011 | 4th partial product |
| .10001111 | Product $a \times b$ |

The arithmetic unit of this invention develops this product in the following way:

*Step 1.*—Multiplicand 1011 is transferred in parallel into stages $A_5$, $A_4$, $A_3$ and $A_2$ of A-register 10 and multiplier 1101 is serially available from B-register 17. Also the signs of operands "$a$" and "$b$" have been multiplied and their product is stored in $A_1$. Clock pulse source 11, through suitable gating circuitry, provides the first clock pulse which transfers the contents of A-register 10 and S-register 13 into parallel adder 12 for adding. The term "first" clock pulse as used herein refers to the clock pulse controlling the operation providing the first partial product. Since S-register 13 is empty at the start of operations, that is, has all its stages set to zero, only the digits of multiplicand "$a$" set the stages $FA_5$, $FA_4$, $FA_3$ and $FA_2$ of parallel adder 12 which therefore, at its output leads 18, provides the sum 1011. At the same time the least significant digit of multiplier "$b$" is applied to S-logic network 16 to either transmit this partial product for storage into S-register 13 or to simply shift the contents of S-register 13 to the right by one bit depending on whether the digit is a "1" or a "0." Since in the selected example the least significant digit of multiplier "$b$" is a "1," the partial product is 1011 and output leads 18 of parallel adder 12 are switched to input leads 20 to set stages $S_4$, $S_3$, $S_2$ and $S_1$ to hold the first partial product 1011. Stage $S_5$ has no input and consequently remains set to "0."

*Step 2.*—At the second clock pulse, the contents of stage $A_5$, $A_4$, $A_3$ and $A_2$ of A-register 10, that is 1011, and of stages $S_5$, $S_4$, $S_3$ and $S_2$ of S-register 13, that is 0101, are transferred into parallel adder 12. Parallel adder 12 develops their sum, which is 10000, which appears except for the most significant digit at the output terminals of stages $FA_5$, $FA_4$, $FA_3$ and $FA_2$. The most significant digit is the carry developed by $FA_5$ which appears on lead 21. At the same time S-logic network 16 has applied to it the second least significant digit of multiplier "$b$" which is a "0." Consequently, S-logic network 16 effectively connects leads 19 to leads 20 and shifts the contents of S-register 13 one bit to the right. Consequently, stages $S_4$, $S_3$, $S_2$ and $S_1$ will be set to contain digit number 0101 at the end of the second clock pulse. Stage $S_5$ is of course set at "0." The carry is discarded since the multiplier digit was a "0" as will be explained in connection with the operation of gate 22.

*Step 3.*—At the third clock pulse, the contents of stages $A_5$, $A_4$, $A_3$ and $A_2$ (1011) of A-register 10 and of stages $S_5$, $S_4$, $S_3$ and $S_2$ (0010) of S-register 13 are once more applied to stages $FA_5$, $FA_4$, $FA_3$ and $FA_2$ of parallel adder 12 which develops their sum 1101. Since the third least significant digit of multiplier "$b$" is a "1," the third partial product is 1011 and the sum developed by parallel adder 12 is the sum of the first three partial products. This sum is set into stages $S_4$, $S_3$, $S_2$ and $S_1$ to read 1101.

*Step 4.*—At the fourth clock pulse, the contents of stages $A_5$, $A_4$, $A_3$ and $A_2$ (1011) of A-register 10 and of stages $S_5$, $S_4$, $S_3$ and $S_2$ (0110) of S-register 13 is again transferred into stages $FA_5$, $FA_4$, $FA_3$ and $FA_2$ of parallel adder 12 which derives their sum namely 10000. As during Step 2, the most significant digit of this sum appears on the carry output lead 21 of stage $FA_5$. Since the most significant digit of multiplier "$b$" is a "1," the fourth partial product is 1011 and the sum of the four partial products is 10000, the product. This sum is applied (except for the most significant digit) to stages $S_4$, $S_3$, $S_2$ and $S_1$ of S-register 13. The most significant digit appearing on lead 21 is gated by an AND circuit 22 and appears on lead 23 when the appropriate digit of multiplier "$b$" is a "1." If lead 23 is directly connected to stage $S_n$ (in the illustrative example $S_5$) as shown by dotted line 23', this stage would be set to "1," and stages $S_5$, $S_4$, $S_3$, $S_2$ and $S_1$ would contain the proper product 10001 to five places.

The reason for not making the connection 23' will become more evident when describing the operation of adding or subtracting a further operand from the product of "*a*"×"*b*." Also, the least significant half of the product may be stored in the register if more than four digits are desired as the result.

*Adding of operand "d" to the product of operands "a" and "b"*

To add an operand "*d*" to the product of multiplicand "*a*" and multiplier "*b*" during the time the product is developed, lead 21 has applied to it the most significant carrying digit of the sum of A-register 10 and S-register 13. Lead 21 is connected to an AND circuit 22 which also has applied to it, via a lead from B-register 17, the appropriate digit of multiplier "*b*" which operates S-logic network 16. The signal on lead 21 may be designated as the $C_{n+1}$ carry because it is developed by the carry logic from $A_n$, $S_n$ and the input carry $C_n$. The most significant digit of the sum of the partial products is applied through AND circuit 22 via lead 23 to one of the input terminals of a full adder stage $FA_{n+1}$ designated 24. Full adder 24 also has sequentially applied to it, through lead 25, digits in increasing order of significance, of an operand "*d*" stored in a shift register 26, also referred to as the D-register. D-register 26 may be similar in construction to B-register 17 and is actuated to apply the digits of operand "*d*" to full adder $FA_{n+1}$ during the time B-register 17 applies its digits to S-logic network 16.

Interposed between D-register 26 and full adder $FA_{n+1}$ is a D-logic network 27 whose function is to respond either to a command "add" or "subtract." Full adder 24 is provided with a conventional carry storage circuit such as a flip-flop 28 which stores the carry developed in the $n+1$ stage fro a one-bit period and thereafter applies this carry, designated as $C_{n+2'}$ to the carry input terminal of $FA_{n+1}$.

The theory of operation of adding operand "*d*" to the sum of the partial products of operand "*a*" and "*b*" is best illustrated by an example. Just as before, let $a=1011$; $b=1101$ and select $d=0101$. Ordinarily the computation of "*a*"×"*b*"+"*d*" by the hand method is as follows:

| | |
|---|---|
| .1011 | multiplicand |
| × .1101 | multiplier |
| 1011 | 1st partial product |
| 0000 | 2nd partial product |
| 1011 | 3rd partial product |
| 1011 | 4th partial product |
| .10001111 | product $a\times b$ |
| .0101 | operand "d" |
| .11011111 | $a\times b+d$ |

Since multiplication comprises the addition of the partial products and since the order of adding the partial products will not affect the result, operand "*d*" may be added, digit by digit, to the several partial products taking into account the significance of the digits. For example, the least significant digit of operand "*d*" may be added as the most significant digit to the least significant partial product, i.e., the partial product due to the least significant digit of multiplier "*b*." Therefore the above hand method may be rewritten as follows:

| | |
|---|---|
| .1011 | multiplicand |
| × .1101 | multiplier |
| 11011 | 1st partial product + least significant digit of "d" |
| 00000 | 2nd partial product + 2nd least significant digit of "d" |
| 11011 | 3rd partial product + 3rd least significant digit of "d" |
| 01011 | 4th partial product + 4th least significant digit of "d" |
| .11011111 | $a\times b+d$ |

where the underlined digits represent the digits of operand "*d*."

The arithmetic unit of FIGURE 1 accomplishes the addition of the digits of operand "*d*" to the sum of the preceding partial products to provide the result of "$a\times b+d$." As explained in connection with the formation of the product of $a\times b$, multiplicand "*a*" is stored in A-register 10 and multiplier "*b*" in the B-register 17. Since in the example selected, the operands have only four digits, an A-register 10 of four stages will be selected and consequently $n=5$ so that "*a*" is stored in stages $A_2$, $A_3$, $A_4$ and $A_5$. At the start, $S_5$ to $S_1$ are set to "zero." Upon a command "multiply-add" applied via lead 29 to D-logic 27 the following steps are taken by the arithmetic unit in addition to actuating clock pulse source 11 via OR circuit 30:

*Step 1.*—Both the A and S registers 10 and 13 supply their contents to parallel adder 12 to form the first sum which in this case is, as before, 1011. At the same time the least significant digit of multiplier "*b*" which is a "one" operates the S-logic network 16 to determine whether the partial product is 1011 or 0000 and sets it so that the proper sum of the partial product is set into stages $S_4$, $S_3$, $S_2$ and $S_1$ of S-register 13. The least significant multiplier digit being a "one" S-register 13 is set to 1011. Also, AND gate 22 is opened but since no $n+1$ carry was developed by adding $A_5$ and $S_5$ and $C_5$, $C_{n+1}$ will be a "zero." Also, the least significant digit of "*d*" is applied through D-logic network 27 and lead 25 to $FA_6$ (whose function is to add to "*d*" the carries $C_6$ and $C_7$ if any). Since both $C_6$ and $C_7$ are zero, the only input to $FA_6$ is the "1" from D-register 26 which sets the output terminal of $FA_6$ to a "high," that is a "1." This output terminal is connected via lead 31 to stage $S_5$ of S-register 13 and sets this stage to "1." This step therefore sets 11011 into stages $S_5$ to $S_1$ of S-register 13 which is the same as the sum of the first partial product and least significant digit of "*d*" as shown in the rewritten hand method.

*Step 2.*—At the next clock pulse, parallel adder 12 adds the contents of A-register 10 and S-register 13 which were respectively 1011 and 1101, since $S_1$ is not applied to the parallel adder) so that stages $FA_5$–$FA_2$ provide the sum 1000 and a carry $C_6$ is developed. The second least significant digit of multiplier "*b*" is "0" and consequently the second partial product is zero and the sum developed by adder 12 is ignored. Instead the contents of S-register 13 are shifted one digit to the right so that stages $S_4$, $S_3$, $S_2$ and $S_1$ are set to 1101. Also AND circuit 22 is not gated (operand "*d*" digit being zero) and consequently carry $C_6$ is not passed to full adder 24. Likewise the second least significant digit of operand "*d*" is zero and $C_7$ is zero so that there is no input to $FA_6$ and consequently no output from full adder 24 so that stages $S_5$ remain at "0." At the end of Step 2, that is the second clock pulse, stages $S_5$ to $S_1$ of S-register 13 contain the number 01101.

*Step 3.*—At the third clock pulse, parallel adder 12 adds 1011 from A-register 10 and 0110 from the S-register 13 and develops their sum which is 0001 and a carry $C_6$ on lead 21. Since the third least significant digit of multiplier "*b*" is a "one," the partial product is 1011 and the sum of the A and S registers are shifted into stages $S_4$–$S_1$ of S-register 13. Also, the third least significant digit of "*b*" opens AND circuit 22 and applies a "1" to one of the input terminals of full adder 24. The third least significant digit of "*d*" is also a "1" and is applied to another one of the input terminals of full adder 24 through line 25. Since two binary one signals are applied ($C_7$ is still zero), the output of $FA_6$ will not change, i.e., remains set to zero but a carry $C_7$ will be developed and stored in $C_7$. Consequently, stage $S_5$ of S-register 13 remains at zero and stages $S_5$ to $S_1$ contain the number 00001 at the end of the 3rd clock pulse.

*Step 4.*—At the fourth clock pulse, parallel adder 12 adds 1011 from A-register 10 and 0000 from the S-register 13 to provide the sum 1011. Again the digit of multiplier "*b*" is a binary one and consequently this sum is transferred into stages $S_4$ to $S_1$ of S-register 13 which now reads 1011. No carry $C_6$ was formed in the fifth stage during this addition and the most significant digit of operand "*d*" is also zero. However, there is still the carry in $C_7$ which is now applied to full adder 24 and which therefore supplies a high output to set stage $S_5$. Consequently, stages $S_5$ to $S_1$ of S-register 13 will read .11011 which is the same result obtained with the hand method illustrated above.

*Subtracting of operand "d" from the product of operands "a" and "b"*

Operand "*d*" may also be subtracted from the product of multiplicand "*a*" and multiplier "*b*" by the arithmetic unit of this invention. Since full adder $FA_{n+1}$ 24 is only a serial adder, the subtraction process is accomplished by adding the 2's complement of operand "*d*" to the most significant carry digit of the sum of the partial products which are applied to full adder $FA_{n+1}$ through AND network 22.

One of the most convenient ways of forming the 2's complement of operand "*d*" is to form the 1's complement of operand "*d*" and to set flip-flop $C_{n+2}$ 28 to "1" at the start of operations as will now be explained. Of course, a conventional double-ended shift-register may be utilized instead of D-register 26 to introduce operand "*d*" into the input circuit of $FA_{n+1}$ either as "*d*" or as the "2's complement of *d*" in accordance with commands MULTIPLY-ADD and MULTIPLY-SUBTRACT, respectively.

The 2's complement of any digital number is formed by first taking the complement of each digit, that is forming the 1's complement, and adding a "1" to the least significant digit of the 1's complement. Adding a "1" to the least significant digit is easily implemented by setting $C_{n+2}$ "high" at the start of operations since the least significant digit of operand "*d*" is applied to full adder $FA_{n+1}$ first. The 1's complement of operand "*d*" is readily formed by providing a conventional inverter 119 in D-logic network 27 and flip-flop $C_{n+2}$ is readily set to "1" by lead 32 connected between the output terminal of an AND circuit 110 and the input terminal to flip-flop 28 as will be explained in connection with the description of FIGURE 3. In this manner, whenever the complement of operand "*d*" is applied to D-logic network 27, $C_7$ is set to "1."

The theory of operation of subtracting operand "*d*" from the sum of the partial products of operands "*a*" and "*b*" is similar to that of adding operand "*d*" except that the 1's complement is added and flip-flop $C_{n+2}$ is preset to "1." This may best be illustrated by an example. Let multiplicand "*a*"=.1010, multiplier "*b*"=.1110 and operand "*d*"=−.1011. Ordinary hand computation would provide the following result:

| | |
|---|---|
| .1010 | multiplicand |
| ×.1110 | multiplier |
| 0000 | 1st partial product |
| 1010 | 2nd partial product |
| 1010 | 3rd partial product |
| 1010 | 4th partial product |
| .10001100 | product $a \times b$ |
| −.1011 | operand "*d*" |
| .00111100 | $a \times b - d$ |
| or +.11011100 | |

Using the same operands as above, this hand method may be rewritten by forming the 2's complement and adding the individual digits to the partial products. The 2's complement of .1011 is .0101. Therefore the rewritten hand method is as follows:

| | |
|---|---|
| .1010 | multiplicand |
| .1110 | multiplier |
| 10000 | 1st partial product + 1st least significant digit of 2's complement of "*d*" |
| 01010 | 2nd partial product + 2nd least significant digit of 2's complement of "*d*" |
| 11010 | 3rd partial product + 3rd least significant digit of 2's complement of "*d*" |
| 01010 | 4th partial product + 4th least significant digit of 2's complement of "*d*" |
| .11011100 | 2's complement of $a \times b - d$ |

where the underlined digits represent the digits of the 2's complement of operand "*d*."

The arithmetic unit of FIGURE 1 provides the same result by storing operand "*a*" in A-register 10, operand "*b*" in B-register 17 and operand "*d*" in D-register 26. Assuming a command MULTIPLY-SUBTRACT applied to lead 33, the following operations commence: clock 11 starts running since it is connected via Or circuit 30 to lead 33; flip-flop $C_{n+2}$ is set to "1" through lead 32 and all digits from D-register 26 are complemented (1's complement) by D-logic network 27 as will be explained in connection with the construction of D-logic network 27. Operand "*d*" as complemented is therefore equal to 0100.

*Step 1.*—Both A-register 10 and S-register 13 dump their contents into parallel adder unit 12 and since S-register is empty, parallel adder 12 provides on its stages $FA_5$, $FA_4$, $FA_3$ and $FA_2$ the sum 1010. At the same time the clock pulse shifts the B-register to apply the least significant digit of multiplier "*b*" to S-logic network 16. Since this digit of operand "*b*" is a "0," the first partial product is zero and the contents of parallel adder 12 is ignored. Instead the contents of S-register 13 is shifted to the right. There being nothing in S-register 13, no change takes place and $S_4$, $S_3$, $S_2$ and $S_1$, remain 0000. At the same time, the clock pulse shifts the least significant 1's complemented digit of operand "*d*" into full adder $FA_6$. The complemented digit of "*d*" being a "0" the only input to $FA_6$ is the "1" previously stored in $C_7$ so that output lead 31 from full adder 24 provides a "1" which sets stages $S_5$ of S-register 13 to "1." At the end of the first clock pulse, stages $S_5$–$S_1$ are set to contain the word 10000 which is the same as derived in the rewritten hand method.

*Step 2.*—At the second clock pulse, the contents of the A-register 10 which is 1010 and the contents of the S-register 13 except for stage $S_1$ which is 1000 is applied to parallel adder 12 and which develops their sum, namely 10010. At the same time the second least significant digit of multiplier "*b*" is sampled by the S-logic network 16 and since it is a "1," the contents of all but the most significant digit of parallel adder 12 is shifted into $S_4$ to $S_1$ of S-register 13 to read 0010. The most significant stage carry digit $C_6$ is applied, through AND circuit 22 opened by the "1" of digit "*b*" to full adder $FA_6$. Also, the complement of the second least significant digit of operand "*d*" is examined and since it is "0" and $C_7$ is also "0," the only input to $FA_6$ is the carry $C_6$. Accordingly, full adder $FA_6$ has a "1" output and sets $S_5$ to "1." At the end of the second clock pulse, stages $S_5$ to $S_1$ of S-register 13 shows the states 10010.

*Step 3.*—At the third clock pulse, the contents of A-register 10 (1010) and four stages of S-register 13 (1001) are applied to parallel adder 12 and are added to provide the sum 10011. Simultaneously, the third significant digit of multiplier "*b*" is sampled by S-logic network 16 and since it is "1," this sum is stored in the first four stages of the S-register 13 to read 0011. The carry of the sum of the partial products, that is $C_6$, is applied, through gate 22 (opened by operand "*b*"), to full adder $FA_6$ which also has applied to it the 1's complement of the third least significant digit of operand "*d*" which is a "1." Accordingly, two of the three inputs to full adder $FA_6$ are high so that its output is low or a "0" and the carry $C_7$ developed is set or stored in $C_7$. Consequently, $S_5$ will remain "0" and the number stores in stages $S_5$ to $S_1$ of S-register 13 reads 000011.

*Step 4.*—At the fourth clock pulse, the contents of A-register 10 (1010) and S-register 13 (0001) are again dumped into full adder 12 which develops the sum 1011. As before the next digit, which is the most significant digit, of multiplier "*b*" is sampled by S-logic network 16 and found to be a "1." Therefore this sum is stored in stages $S_4$ to $S_1$ of S-register 13 which now read 1011. Since no carry was generated when this sum was developed, lead 21 is low and gate circuit 22 remains closed. Simultaneously, the 1's complemented most significant digit of operand "*d*," which is a "0," is applied to $FA_6$. Also the "1" stored during the preceding clock pulse in $C_7$ is applied to full adder $FA_6$ so that its output will be a "1," the carry developed at the third clock pulse being its only input. Consequently, stage $S_5$ will be set to "1," and S-register 13 now reads 11011.

Since at the start of the multiply-subtract operation $C_7$ or $C_{n+2}$ was set to "1," the same condition must exist at the termination of the operation or the result stored in S-register 13 is the 2's complement of the desired result. Since $C_7$ was empty at the termination of the fourth clock pulse, the result in S-register 13 is the 2's complement of the correct answer. The proper answer is easily obtained as well known by those skilled in the art, by subtracting a "1" from the fourth most significant digit, complementing the answer so obtained, and adding a minus sign. Therefore 2's complement (11011) = —.00110

*The S-logic network*

Figure 2:
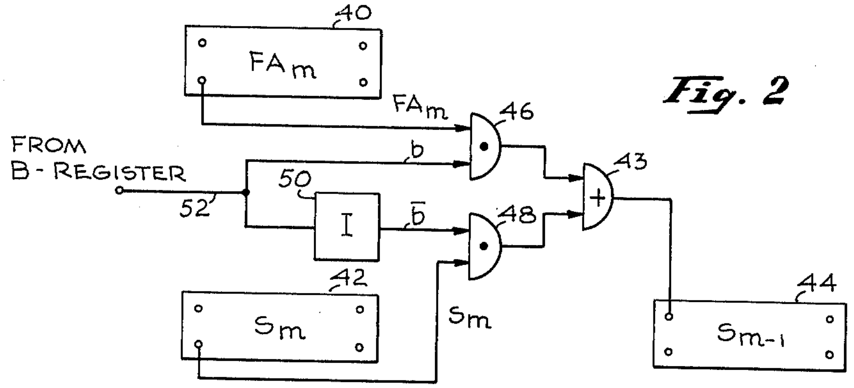
FIGURE 2 is a block diagram of an S-logic network employed in the unit of FIGURE 1.

As explained hereinbefore, S-logic network 16 operates to either cause the sum developed by parallel adder 12 to be stored in S-register 13 so that the output of stage $FA_m$ is stored in stage $S_{m-1}$ or shift the contents of S-register 13 one stage to the right so that the digit of stage $S_m$ is shifted to stage $S_{m-1}$. Transfer from parallel adder 12 is to take place when multiplier digit *b* is a "1" and shifting is to take place when multiplier digit *b* is a "0." The Boolean equation for the logic between the output of the full adder $FA_m$ 12, flip-flop $S_m$ and adjacent flip-flop $S_{m-1}$ of S-register 13 to satisfy these conditions is $$S_{m-1}=S_m\bar{b}+FA_m b \quad N\geqq M\geqq 2$$

where $\bar{b}$ is the notation for "not *b*." The logical network between $FA_m$, $S_m$ and $S_{m-1}$ is shown in FIGURE 2 and comprises $FA_m$ full adder 40, $S_m$, flip-flop 42 and $S_{m-1}$ flip-flop 44. The output terminals of full adder 40 and flip-flop 42 are connected to separate AND circuits 46 and 48 respectively. Applied to AND circuits 46 and 48 are the appropriate digit of multiplier "*b*," an inverter circuit 50 being interposed between lead 52 from B-register 17 and circuit 48 so that a "1" is provided when "*b*" is "0." The outputs of circuits 46 and 48 are applied to an OR circuit 43 which has its output connected to the input terminal of $S_{m-1}$ flip-flop 44. In operation, when a digit of "*b*" is a binary one, AND circuit 46 is opened to allow a "1" from full adder 40 to set flip-flop 44. Of course if the full adder output is a binary zero, flip-flop 44 will not be set. If a digit of "*b*" is "0," inverter circuit 50 provides a "high" output and opens gate circuit 48 and allows the output of flip-flop 42 to set flip-flop 44. During this time gate circuit 46 remains closed.

*The D-logic network*

The D-logic network is responsive to commands MULTIPLY-ADD and MULTIPLY-SUBTRACT. Upon receiving the command MULTIPLY-ADD, and assuming that the product of operands "*a*" and "*b*" is positive and operand "*d*" is positive, the digits of operand "*b*" are to be applied to full adder $FA_{n+1}$ and clock 11 is to start operating. Upon receiving a command MULTIPLY-SUBTRACT, and again assuming that both the product of operands "*a*" and "*b*" and operand "*d*" are positive, D-logic network 27 is to actuate clock pulse source 11 as before but now it is to apply the 1's complement of operand "*d*" to full adder $FA_{n+1}$ which together with the binary "1" loaded into flip-flop $C_{n+2}$ constitutes the 2's complement of operand "*d*."

However, when the product of operands "*a*" and "*b*" is positive and operand "*d*" is negative, then, upon a command MULTIPLY-SUBTRACT the true value of operand "*d*" is added and not its 2's complement. Likewise, when the product of operands "*a*" and "*b*" is negative and operand "*d*" is positive, then, upon a command MULTIPLY-ADD the 2's complement of operand "*d*" is added and not its true value. Accordingly, the sign of the various operands, which have been neglected in the previous illustrative examples must be taken into account.

Referring to FIGURE 1, there is shown a switch or gate 100 connected to the output circuit of B-register 17 and D-register 26. Switch 100 is basically a two-way switch actuated by the output signal from OR gate 30, i.e., the same signal which actuates clock 11. Switch 100 connected to the output circuit of B-register 17 upon being actuated by a command shifts the first digit of B-register 17, which is the "sign" of operand "*b*," into an F-logic network 102 instead of applying the first digit to S-logic network 16 and AND gate 22. One clock pulse later, switch 100 is switched to its other position so that the second digit of operand "*b*," which is the first "magnitude" digit, is applied to S-logic network 16 and AND gate 22 as previously explained. Similarly, the switch 100, connected to the output circuit of D-register 26, applies its first or "sign" digit to F-logic network 102 and its second or first "magnitude" digit to D-logic circuit 27.

From the above stated performance conditions for D-logic network 27, the Boolean equation therefore can be readily written down.

Output signal of D-logic network $$=(MA)(Fd+\bar{F}\bar{d})+(MS)(F\bar{d}+\bar{F}d)$$

and $$F=a.\bar{b}.\bar{c}+\bar{a}.\bar{b}.c+\bar{a}.b.\bar{c}$$

where (MA) is MULTIPLY-ADD
(MS) is MULTIPLY-SUBTRACT
*d* is a magnitude digit of operand *d*
*a, b, c,* are the sign digits of operands "*a*," "*b*" and "*c*" and all complements are the 1's complements.

Figure 3:
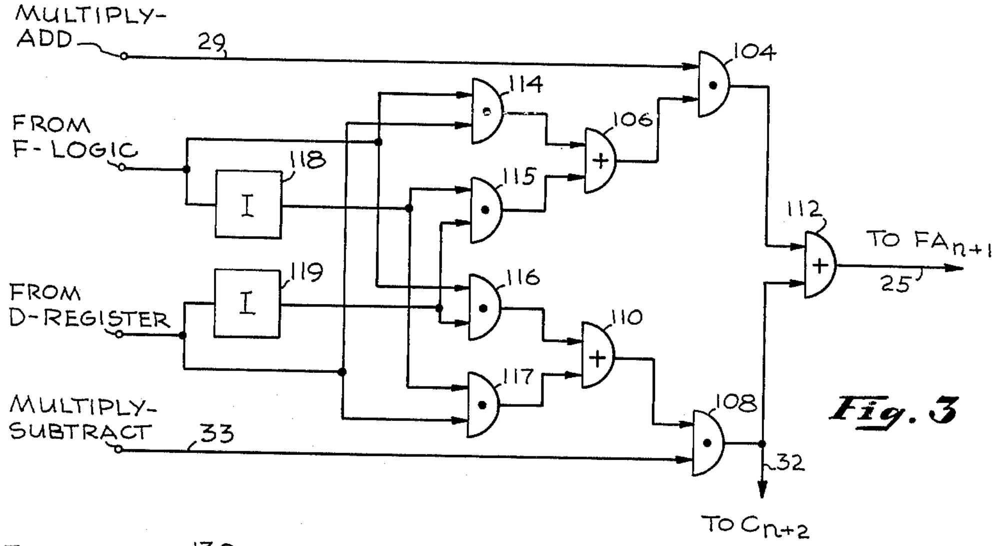
FIGURE 3 is a D-logic network employed in the unit of FIGURE 1.

This equation may be implemented, as shown in FIGURE 3, by applying the commands MA to an AND circuit 104 which also has applied to it the output signal of an OR circuit 106 corresponding to the expression $Fd+\bar{F}\bar{d}$. The command MS is applied to an AND circuit 108 together with the output signal of an OR circuit 110 which corresponds to the expression $\bar{F}d+F\bar{d}$. The output terminals of both AND circuits 104 and 108 are connected to the input terminals of an OR circuit 112 whose output terminal 25 therefore supplies either *d* or $\bar{d}$ depending on the sign of operands "*a*," "*b*" and "*d*" and the commands MA or MS to full adder $FA_{n+1}$.

The expression F developed by F-logic network 102 is applied to the input terminals of a pair of AND circuits 114 and 116, and also, after being complemented by an inverter circuit 118, to another pair of AND circuits 115 and 117. Similarly, the "magnitude" digits of operand "*d*" are applied to AND circuits 114 and 117 and also, after being complemented by an inverter circuit 119, to AND circuits 115 and 116. The output terminals of AND circuits 114 and 115 are connected to the input terminals of OR circuit 106 and the output terminals of AND circuits 116 and 117 are connected to the input terminals of OR circuit 110.

Also, as mentioned hereinbefore, lead 32 is connected to flip-flop 28 to set it to "high" at the commencement of the MS operation to provide the 2's complement of operand "*d*." In operation, when a command MA is applied to lead 29, AND circuit 104 will have a "high" ouput if the output signal from OR circuit 106 is "high." Of course commands MA and MS are of much longer duration than a digit-time, in fact, the length of the MS or MA pulse is equal to a word time which is a minimum of $n+1$ digit times. Consequently, AND circuit 104 remains open during the time interval necessary to complete the MA operation. The output from circuit 104 is applied to OR circuit 112 which has a "high" output when one of its input terminals are high.

Figure 4:
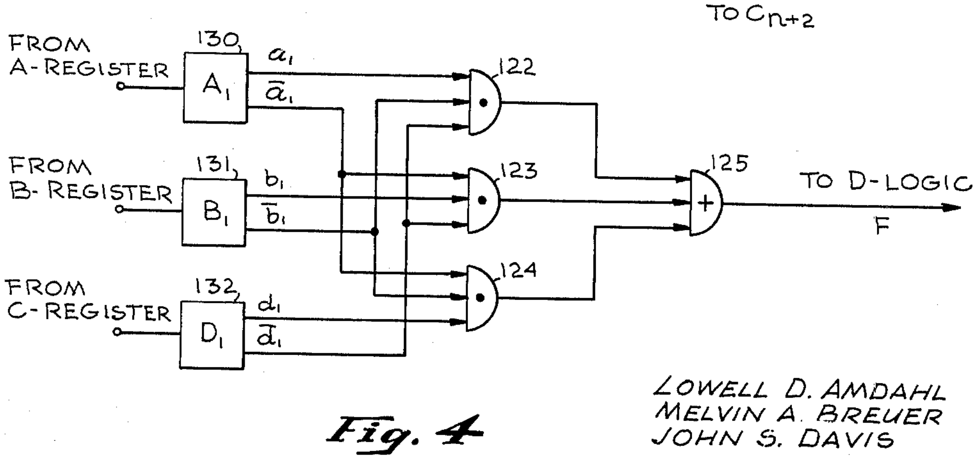
FIGURE 4 is a F-logic network employed in the unit of FIGURE 1.

The F-logic network 102 is actually a part of D-logic network 27 and is shown separately in FIGURE 4 merely for the sake of clarity. F-logic network 102 comprises three three-way AND circuits 122, 123, and 124 having their respective output terminals connected to the input terminals of a three-way OR circuit 125. The output terminal of OR circuit 125 is connected to D-logic network 27 as previously described. The sign $a_1$ of operand "*a*" is available from the $A_1$ stage of A-register 10 which sets the flip-flop 130. The signs $b_1$ and $d_1$ of operands "*b*" and "*d*" are shifted out respectively from B-register 17 and D-register 26 during the first clock pulse and applied, via controlled switches 100, to flip-flops 131 and 132. The "high" output terminal of flip-flop 130 is connected to AND circuit 122 and the "low" output terminal to AND circuits 123 and 124. Similarly the "high" output terminal of flip-flops 131 and 132 are respectively connected to AND circuits 123 and 124 and the "low" output terminals to AND circuits 122, 124 and 122, 123.

*The $FA_{n+1}$ and $C_{n+1}$ circuits*

Full adder 24 is a conventional full adder which forms the sum of three of the binary representations applied to its input terminals. The first binary number is the highest order digit of the sum of the partial products, that is, the carry developed, if any, by adding $A_n$, $A_{n-1}$ . . . $A_3$, $A_2$ and $S_n$, $S_{n-1}$ . . . $S_3$, $S_2$ provided that the appropriate digit of multiplier "*b*" is "1" and actuates AND circuit 22. The second binary number is the appropriate digit of operand "*d*." The third binary number is the output of flip-flop 28 which is of course the carry $C_{n+2}$ developed by $FA_{n+1}$ during the previous clock pulse or the "1" stored in $C_{n+2}$ by the MS command at digit time zero. The output of $FA_{n+1}$ comprises conventionally a sum and a carry signal which are respectively utilized to set stages $S_n$ of the S-register and $C_{n+2}$ has been explained.

Flip-flop 28 is also a conventional circuit of the bistable type which stores the carry developed by $FA_{n+1}$ for one bit-time and then applies it to the appropriate input terminal of $FA_{n+1}$.

There has been described an arithmetic unit for an electronic computer which provides the product of two binary numbers and adds thereto or substracts therefrom a further binary number during the time the product is formed. The product is formed by deriving the partial products and adding the partial products to the sum of the previously derived partial products. The further binary number may be added to or subtracted from the product by adding a digit or the 2's complement of a digit of the further binary number to the derived partial product of the same order of significance.

What is claimed is:

1. A binary computing system for obtaining the product of a first and a second operand and adding thereto or subtracting therefrom a third operand, said system comprising: parallel adder means; first register means coupled to said parallel adder means for applying thereto binary signals representing said first operand; second register means coupled to said parallel adder means for applying thereto binary signals stored therein, said parallel adder means being operative to derive binary signals representing the sum of the binary representations in said first and second register means; first shift register means for sequentially providing binary signals representing the digits of said second operand; switching means coupling stages of corresponding degrees of significance of said parallel adder means and second register means to the next significant stages of said second register means, said switching means being responsive to the binary signals from said first shift register means and operative to set the stages of said second register in accordance with the sum developed by said parallel adder means in response to a binary one and to shift the contents of said second register in response to a binary zero; second shift register means for sequentially providing binary signals representing the digits of said third operand; and circuit means coupling said second shift register means to said second register means for sequentially adding the digits of said third operand to the most significant digit of the binary number in said second register means.

2. A system for obtaining the product of two numbers and adding thereto a further number, each number being represented as binary coded signals, said system comprising: partial product means for sequentially deriving the partial products of said two numbers; adding means for adding each derived partial product to the sum of all previously derived partial products prior to deriving the next partial product; and means for adding to the sum derived by said adding means the digit of said further number having the same degree of significance as the partial product derived by said partial product means prior to deriving the next partial product.

3. A system for obtaining the product of two numbers and adding thereto a further number, each number being represented as binary coded signals, said system comprising: partial product means for sequentially deriving increasingly more significant partial products of said two numbers; adding means for adding each derived partial product to the sum of all previously derived partial products modified by corresponding digits of said further number prior to deriving the next partial product; and means for adding to the sum derived by said adding means the digit of said further number having the same degree of significance as the partial product derived by said partial product means prior to deriving the next partial product.

4. A computer for developing a quantity which represents the product of a first and second operand increased or decreased by a third operand, said computer comprising: a first register means for storing binary signals representing said first operand; a parallel adder means; parallel circuit means for connecting said first register to said parallel adder; a second register means; parallel circuit means for connecting the output terminals of said second register to said parallel adder; a plurality of switching means each having a pair of input terminals and an output terminal; circuit means for connecting said pair of input terminals to the output terminals of said parallel adder and said second register respectively; circuit means for connecting the output terminal of said switching means to the input terminal of said second register; means for sequentially applying binary signals representing the digits of said second operand, said switching means being responsive to said sequentially applied digits of said second operand and operative to switch one of said pair of input terminals to said output terminal in accordance with the state of said sequentially applied digits of said second operand; means for sequentially providing binary signals representing the digits of said third operand; and means for setting the most significant stage of said second register in accordance with the sequentially applied digits of said third operand.

5. A computer for developing a quantity which represents the product of a first and second operand increased or decreased by a third operand, said computer comprising: a first register means having $n-1$ stages for storing binary signals representing said first operand; a parallel adder means having $n-1$ stages; parallel circuit means for connecting each stage of said first register to a corresponding stage of said parallel adder; a second register means having $n$ stages; parallel circuit means for connecting the output terminals of each but the least significant stage of said second register to the corresponding stages of said parallel adder; switching means having $n-1$ stages, each stage having a pair of input terminals and an output terminal; circuit means for connecting the pair of input terminals of each stage of said switching means to the output terminals of the stages of said parallel adder and all but the least significant stage of said second register respectively; circuit means for connecting the output terminals of said stages of said switching means to the input terminals of all but the most significant stage of said second register; means for sequentially providing binary signals representing the digits of said second operand, said switching means being responsive to said sequentially applied digits of said second operand and operative to switch one of said pair of input terminals to said output terminal in accordance with the state of said sequentially applied digits of said second operand; means for sequentially providing binary signals representing the digits of said third operand; and means for setting the most significant stage of said second register in accordance with the sequentially applied digits of said third operand.

6. A computer for performing the operation of providing the product of a multiplicand and a multiplier and either adding thereto or subtracting therefrom an operand, said computer comprising: multiplicand register means for storing binary signals representing said multiplicand; parallel adder means; sum register means for storing binary signals representing the sum of partial products; parallel circuit means for connecting corresponding stages of said multiplicand register means and said sum register means to said parallel adder means; multiplier means for sequentially providing binary signals representing the digits of said multiplier in increasing order of significance; logic switching means responsive to the binary signal from said multiplier means and operative to shift the binary signal in said sum register to a position of one degree less significance in response to a binary signal of "zero" and to store the sum developed by said parallel adder means in said sum register in response to a binary signal of "one"; operand means for sequentially providing binary signal representing the digits of said operand in increasing order of significance; and means responsive to the binary carry signal from the most significant stage of said parallel adder when the binary signal from said multiplier means is "one" and to the binary signal from said operand means and operative to develop a binary signal representing their sum and store this binary sum signal in the most significant stage of said sum register means.

7. A computer for performing the operation of providing the product of a multiplicand and a multiplier and either adding thereto or subtracting therefrom an operand, said computer comprising: multiplicand register means having $n-1$ stages for storing binary signals representing said multiplicand; parallel adder means having $n-1$ stages; register means having $n$ stages for storing binary signals representing the sum of partial products; parallel circuit means for connecting each stage of said multiplicand register means and all but the least significant stage of said sum register means to corresponding stages of said parallel adder means; multiplier means for sequentially providing binary signals representing the digits of said multiplier in increasing order of significance; logic switching means responsive to the binary signal from said multiplier means and operative to shift the binary signal in said sum register to a position of one degree less significance in response to a binary signal of "zero" and to store the sum developed by said parallel adder means in all but the most significant stage of said sum register in response to a binary signal of "one"; operand means for sequentially providing binary signal representing hte digits of said operand in increasing order of significance; and means responsive to the binary carry signal from the most significant stage of said parallel adder when the binary signal from said multiplier means is a "one" and to the binary signal from said operand means and operative to develop a binary signal representing their sum and store this binary sum signal in the most significant stage of said sum register means.

8. An arithmetic unit for use with an electronic computer to derive the product of a multiplicand and a multiplier diminished or increased by an operand, said arithmetic unit comprising: first register means for storing binary signals representative of said multiplicand; a parallel adder means; second register means for storing binary signals representative of numbers derived by said parallel adder means; first circuit means for applying the binary signals stored in said first and second register to said parallel adder means for deriving binary signals representative of their sum; multiplier shift register means for serially providing binary signals representing the digits of said multiplier in increasing order of significance; operand shift register means for serially providing binary signals representing the digits of said operand in increasing order of significance; second circuit means responsive to the binary signals from said multiplier shift register means and operative to shift the contents of said second register to a position of one degree less significance in response to one type of multiplier digit binary signal and also operative to store the sum derived by said parallel adder means in stages of said second register, which correspond to the same degree of significance as the stages for accommodating said shifted contents, in response to the other type of multiplier digit binary signal; third circuit means for connecting said operand shift register means to the most significant stage of said second register means, said third circuit means including adding means responsive to the digital signal from said operand shift register means and a gated carry signal from the most significant stage of said parallel adder means and operative to derive a digital signal representing their sum and set the most significant stage of said second circuit means in accordance with the digital signal representing said sum; and gating means responsive to digital signal from said multiplier shift register means connected to the most significant stage of said parallel adder means and providing said gated carry signal.

9. A computer for performing the operation of providing the product of a multiplicand and a multiplier and either adding thereto or subtracting therefrom an operand, said computer comprising: a first register means for storing the binary representation of said multiplicand; a parallel adder means; a second register means; circuit means for connecting the output terminals of the $M^{th}$ stage of said first register means and said second register means to the input terminals of the $M^{th}$ stage of said parallel adder means; multiplier shift register means for serially providing an indication of binary representation of the digits of said multiplier in increasing order of significance; logical switch means; circuit means for connecting the output terminals of the $M^{th}$ stage of said parallel adder and of said second register means to the input terminals of said logical switch means and the output terminals of said logical switch means to input terminals of the $M-1^{th}$ stage of said second register means, said logical switch means being responsive to binary representation of the digits of said multiplier and operative to select either the $M^{th}$ stage of said second register means or the $M^{th}$ stage of said parallel adder means for setting the $M-1^{th}$ stage of said second register means in accordance with said binary representation; operand adder means; operand shift register means for serially providing an indication of the binary representation of the digits of said operand in increasing order of significance and connected to one of the input terminals of said operand adder means; gating means responsive to the binary representation of said multiplier for connecting the carry output terminal of the most significant stage of said parallel adder means to another of the input terminals of said operand adder means; and circuit means for coupling the output terminal of said operand adder means to the most significant of said second register means.

References Cited by the Examiner

UNITED STATES PATENTS

| | | | |
|---|---|---|---|
| 2,936,116 | 5/60 | Adamson et al. | 235—176 |
| 2,994,478 | 8/61 | Sarahan et al. | 235—175 |

MALCOLM A. MORRISON, *Primary Examiner.*

DARYL W. COOK, *Examiner.*